(No Model.) 3 Sheets—Sheet 1.

A. S. FOLGER & D. WILDE.
EVAPORATOR.

No. 309,842. Patented Dec. 30, 1884.

(No Model.) 3 Sheets—Sheet 2.

A. S. FOLGER & D. WILDE.
EVAPORATOR.

No. 309,842. Patented Dec. 30, 1884.

Witnesses
Wm. J. Tanner
J. W. Garner

Inventors
A. S. Folger and D. Wilde
England & Blanchard
Attys (No Model.) 3 Sheets—Sheet 3.
A. S. FOLGER & D. WILDE.
EVAPORATOR.

No. 309,842. Patented Dec. 30, 1884.

Witnesses
Geo. S. Tanner
J. W. Garner

Inventors
A. S. Folger & D. Wilde
England & Blanchard
Attorneys

UNITED STATES PATENT OFFICE.

A. SMITH FOLGER AND DANIEL WILDE, OF WASHINGTON, IOWA.

EVAPORATOR.

SPECIFICATION forming part of Letters Patent No. 309,842, dated December 30, 1884.

Application filed March 29, 1884. (No model.)

*To all whom it may concern:*

Be it known that we, A. SMITH FOLGER and DANIEL WILDE, citizens of the United States, residing at Washington, in the county of Washington and State of Iowa, have invented certain new and useful Improvements in Evaporators, of which the following is a specification, reference being had therein to the accompanying drawings.

Our invention relates to an improvement in evaporators; and it consists in the peculiar construction and combination of devices, that will be more fully described hereinafter, and particularly pointed out in the claims.

Figure 1:
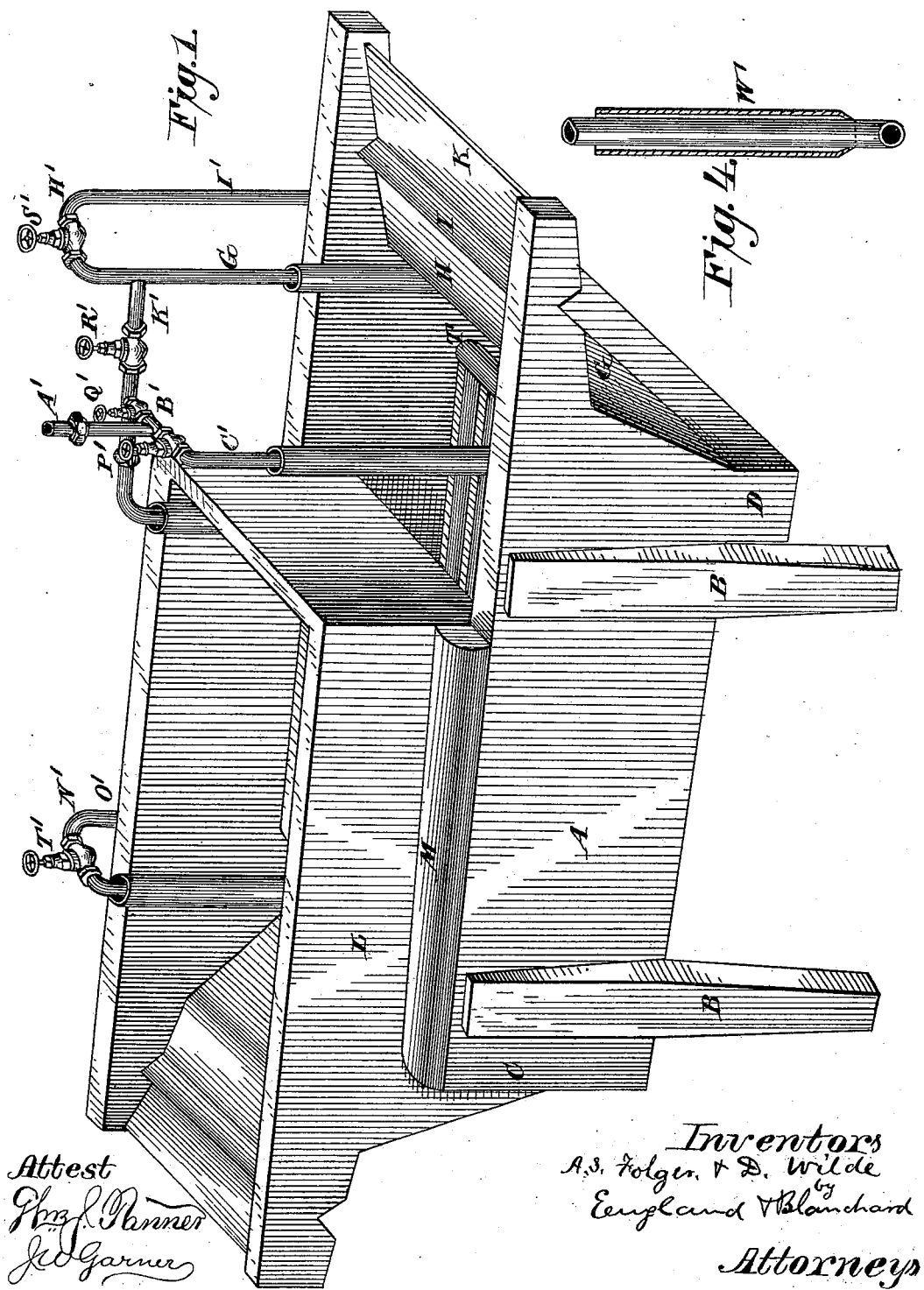
Figure 2:
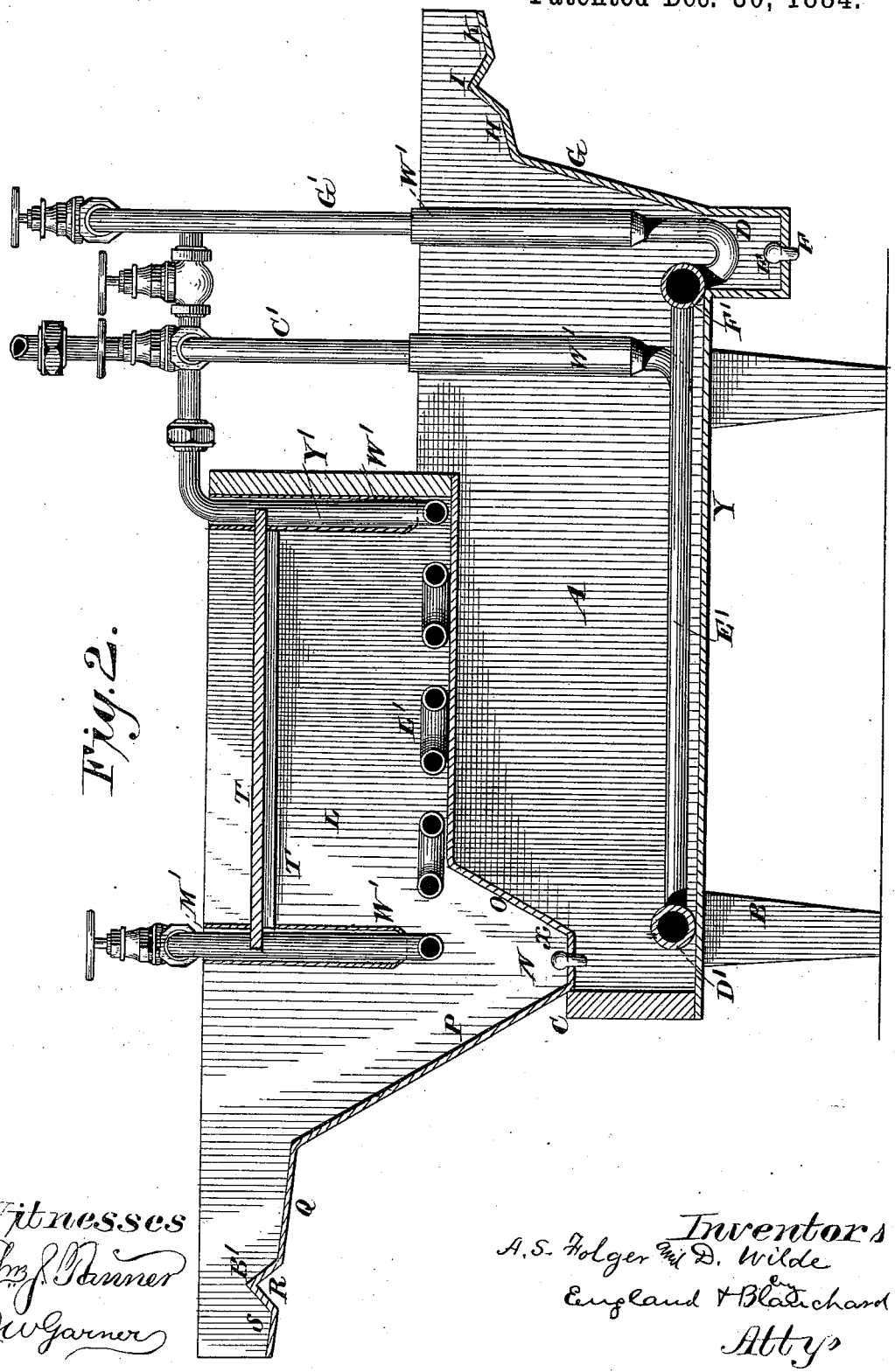
Figure 3:
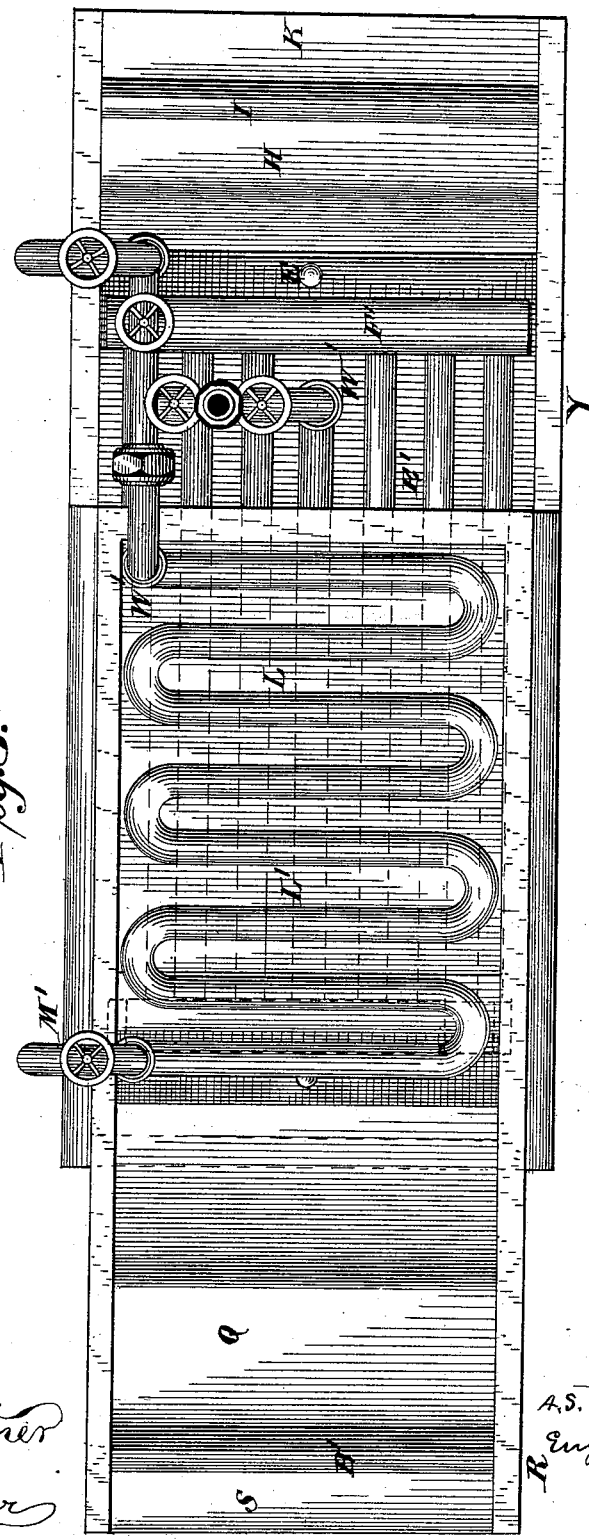

In the accompanying drawings, Figure 1 is a perspective of our invention. Fig. 2 is a vertical longitudinal section of the same. Fig. 3 is a top plan view. Fig. 4 is a detailed vertical section of one of the feed-pipes, showing the guard placed thereon.

A represents a reducing-pan which is supported upon legs B, and which has one of its ends lower than its sides, as at C. Near the opposite end of the pan is formed a depression, D, which is provided with an opening, E, which is adapted to be closed by a suitable plug, F. From this depression extends outwardly, at a suitable angle, the inclined end G, at the upper side of which is formed a slightly-inclined cooling-apron, H. A ledge, I, separates this apron from an inclined trough, K, that is secured to the outer end of the pan A.

L represents a clarifying-pan that is provided with ledges M on its sides, which rest upon the tops of the sides of the pan A, and thus secure the clarifying-pan thereupon. This clarifying-pan is similar in construction to the pan A, being somewhat smaller than said pan. The depression N of the clarifying-pan is placed in the end C of the reducing-pan, and from this depression the bottom of the pan inclines inwardly and upwardly at O, for the purpose to be hereinafter set forth. From the outer side of this depression extends the incline P, leading to the cooling-apron Q, which is separated by the ledge R from the trough S. This clarifying-pan thus forms a cover for the reducing-pan, and is itself provided with a cover that rests upon the ledges or cleats T, which are secured upon its inner sides at one end at a suitable distance from the bottom.

A' represents a steam-pipe that leads from a suitable steam-boiler. This steam-boiler is not shown in the drawings, as it is not necessary that it should be illustrated in order to enable the invention to be understood. The pipe A' is connected to a short horizontal pipe, B', from the inner end of which extends downward a vertical pipe, C', which extends nearly to the bottom of the pan A, where it passes forward, and is connected at its outer end to the center of a larger pipe, D', that extends across the bottom of the pan A. This pipe D' is connected by a series of pipes, E', to a similar pipe, F', that extends across the opposite end of the pan A. From the pipe E' extends upwardly a vertical pipe, G', which is bent at H' into a goose-neck and terminates in a downward vertical extension, I'. Leading from the pipe G' is a horizontal pipe, K', which connects with the pipe B', and which extends downwardly into a clarifying-pan, L, where it is bent into coils L', that extend along the bottom of the clarifying-pan and terminate in a vertical pipe, M', a goose-neck, N', and a downward vertical extension, O'.

P' represents a globe-valve that is placed in the pipe B', between the pipe A' and the pipe C'.

Q' represents a similar valve that is located in the same pipe, between the pipes A' and K'. The pipe K' is likewise provided with a globe valve, R', between the pipes B' and G', and the pipes G' and M' have valves S' and T' located in their goose-necks, respectively.

The operation of our invention is as follows: Juice is admitted into the clarifying-pan until the coil therein is covered. The valves Q' and T' are then opened and the steam is allowed to pass through the coil L' and exhaust through the pipe O'. This produces a violent ebullition of the juice under the cover in the clarifying-pan, and this action thereon forces the scum and foreign substances that arise on the juice from under the cover and causes it to be lodged on the cooling-apron Q, where it can be swept by the attendant over the ledge into the trough S. The juice is allowed to flow continuously into the clarifying-pan, and, when the coarse scum has been all removed from the rear end of the pan, the faucet X is opened and the clarified juice is allowed to flow into the reducing-pan. When the pipes therein are covered, the valves P' and R' are opened and the pipe O' is closed. This arrangement makes connection of the branch Y with the coils L', and thus the hot steam direct from the boiler is caused to be admitted first into the branch Y at the rear end of the reducing-pan, from whence it passes through the pipes E' into the pipe F', through the pipe G', into the pipe K', and from thence through the valve Q' into the coil in the clarifying-pan, and discharges through the valve T'. By this construction and arrangement of devices we are enabled to apply the hot steam directly from the boiler to the clarified juice in the reducing-pan, and when its heat is partially exhausted it is conducted into the coil in the clarifying-pan, where the remainder of its heat is utilized before it is allowed to escape into the open air, thus effecting a great economy in the use of the steam. When thus used, a sufficient pressure of steam is admitted through the valve P' to raise the clarified juice in the reducing-pan to the proper temperature, and, should it cause too great heat in the clarifying-pan, the valve R' may be partially closed, so that the volume of steam which is passing through the clarifying-pan may be controlled and the heat in the clarifying-pan thus maintained at the desired degree. Should there be sufficient heat in the reducing-pan, and not enough in the clarifying-pan, to produce the desired result, the valve R' may be opened to its full extent and the valve Q' partially opened, so as to cause enough of the live steam direct from the boiler to pass into coil L' to raise the heat in the clarifying-pan to the requisite degree. Should the operator desire to use the live steam in both sections of pipe, the valve R' will be closed and valves Q' and P' opened. By opening the valve Q' the steam will pass directly through the coil in clarifying-pan and exhaust at valve T'. Opening valve P' admits steam through the branch in the reducing-pan and discharges at valve S'. The sirup is drawn from the reducing-pan when about two-thirds reduced into a "strike" or finishing-pan of any suitable kind, where it is finished to a sirup of the desired density, or it may be finished in the reducing-pan, if preferred. If desired, this apparatus may be employed to work upon the "batch" plan—that is to say a quantity of juice may be admitted at once into the clarifying-pan, the "blanket" or scum removed therefrom, and then drained into the reducing-pan, from whence it may be either drawn off into a strike-pan or finished direct therein.

The function of the incline O in the clarifying-pan is, first, to form a sedimentary deposit in the depression N, and, secondly, to cause the steam generated from the boiling liquid in the reducing-pan to be deflected toward the front end thereof, and thus cause it to drive the scum before it as it arises, and deposit said scum upon the chill or cooling apron H. When the scum is thrown upon this apron, it is cooled, and the albuminoids and gums are precipitated thereon, and those that coagulate adhere to the scum and are removed with it, while those that are soluble run away, and, being of greater specific gravity than the pure juice, glide down the incline G into the depression D, from which they may be drawn off and separated from the pure juice through the opening E by removing the plug F.

Upon the vertical pipes G', C', Y', and M', we place guard-pipes W', which are secured to said vertical pipes at their lower ends, and which have their upper extremities open, as shown in detail at Fig. 4. This construction causes a chamber to be formed around the vertical pipes where they are submerged in the sirup, and into these chambers the air enters and causes the guards W' to be at a much lower temperature than the vertical steam-pipes to which they are attached. The function of these guards is to prevent the juice from scorching on the heated pipes, as the foam of the liquid settles down after having been raised at a high temperature.

Having thus described our invention, we claim—

1. The combination of a clarifying-pan, a reducing-pan, and steam-pipes that are located in said pans and connected to a common supply-pipe, substantially as specified.

2. The combination of a clarifying-pan, a reducing-pan, and steam-pipes that are located in said pans, the clarifying-pan being provided with means for discharging its contents into the reducing-pan, substantially as set forth.

3. The combination of a clarifying-pan, a reducing-pan, steam-pipes that are located in said pans and connected to a common supply-pipe, and suitable valves whereby the steam may be caused to pass through either the pipes in the clarifying-pan or the reducing-pan, or both at the same time, substantially as described.

4. The combination of a clarifying-pan, a reducing-pan, steam-pipes that are located in said pans connected to a common supply-pipe, and having a pipe connecting them together, and suitable valves whereby the steam may be caused to pass through either the pipes in the clarifying-pan or the reducing-pan, or both at the same time, or first through one set and then through the other, whereby the exhaust-steam from one set can be utilized by the other set, substantially as shown and described.

5. The combination of a clarifying-pan having a depression, an incline leading thereto, and a cooling-apron, a reducing-pan of similar construction, and steam-pipes located in said pans, substantially as shown.

6. The combination of a clarifying-pan having a depression, an incline leading thereto, and a cooling-apron, a reducing-pan of similar construction subjacent thereto, means for discharging the contents of the clarifying-pan into the reducing-pan, and steam-pipes that are located in said pans, substantially as specified.

7. The combination of a clarifying-pan having a depression, an incline leading thereto, and a cooling-apron, a reducing-pan of similar construction subjacent thereto, means for discharging the contents of the clarifying-pan into the reducing-pan, steam-pipes that are located in said pans connected to a common supply-pipe, and having a pipe connecting them together, and suitable valves whereby the steam may be caused to pass through either set of pipes, or both at the same time, or first through one set and then through the other, for the purpose set forth, substantially as specified.

8. The pipes provided with guards, for the purpose of forming a cooling-chamber around said pipes, whereby scorching of the juice is prevented, substantially as set forth.

9. A reducing or clarifying pan having a cooling-apron, a ledge at the outer side of the cooling-apron, and a trough extending beyond the ledge, substantially as described.

10. The combination of pan A and pan L, whereby pan L forms a cover to pan A, and thereby automatically skims the juice in pan A, and the escaping heat from pan A being absorbed and utilized in pan L, substantially as shown.

In testimony whereof we affix our signatures in presence of two witnesses.

A. SMITH FOLGER.
DANIEL WILDE.

Witnesses:
R. P. McCONAUGHY,
JNO. H. WILDE.